United States Patent [19]

Grach

[11] Patent Number: 4,976,192
[45] Date of Patent: Dec. 11, 1990

[54] RECIPROCATING PUMP

[75] Inventor: Ayzik Grach, Creve Coeur, Mo.

[73] Assignee: McNeil (Ohio) Corporation, St. Paul, Minn.

[21] Appl. No.: 295,126

[22] Filed: Jan. 9, 1989

[51] Int. Cl.$^5$ .............................................. F16J 15/18
[52] U.S. Cl. ................................... 92/165 R; 92/87; 92/168; 277/24; 277/53
[58] Field of Search ................. 92/86, 87, 165 R, 166, 92/171, 168, 162; 277/24, 3, 27, 53, 54, 55, 56, 57

[56] References Cited

U.S. PATENT DOCUMENTS

| | | | |
|---|---|---|---|
| 2,250,164 | 7/1941 | Minder | 92/165 R |
| 2,638,124 | 5/1953 | Nickerson | 92/165 R |
| 2,992,864 | 7/1961 | De Carbon | 308/3.5 |
| 3,025,087 | 3/1962 | Snow | 277/112 |
| 3,049,370 | 8/1962 | Bertrand | 92/165 R |
| 3,146,684 | 9/1964 | Vanderhoof | 92/165 R |
| 3,232,639 | 2/1966 | Kosinski et al. | 92/165 R |
| 3,300,225 | 1/1967 | Shepler | 277/165 |
| 3,471,156 | 10/1969 | Burns et al. | 277/3 |
| 3,518,920 | 7/1970 | Bimba | 92/168 |
| 3,600,007 | 8/1971 | Morris | 285/35 |
| 3,603,213 | 9/1971 | Tootle | 92/165 R |
| 3,615,160 | 10/1971 | Feather | 285/250 |
| 3,658,348 | 4/1972 | Nink | 92/165 R |
| 3,701,549 | 10/1972 | Koomey et al. | 285/24 |
| 3,733,093 | 5/1973 | Seiler | 285/342 |
| 3,848,905 | 11/1974 | Hammer et al. | 285/286 |
| 3,865,015 | 2/1975 | Hakansson | 92/165 R |
| 3,870,381 | 3/1975 | Overkott | 308/3.5 |
| 4,048,908 | 9/1977 | Urquhart | 92/165 R |
| 4,106,779 | 8/1978 | Zabcik | 92/86 |
| 4,135,723 | 1/1979 | Urquhart | 92/162 R |
| 4,185,721 | 1/1980 | Karklins | 92/168 |
| 4,211,151 | 7/1980 | Wallischeck | 92/146 |
| 4,476,772 | 10/1984 | Gorman et al. | 92/168 |
| 4,504,069 | 3/1985 | Stenlund | 277/27 |
| 4,597,322 | 7/1986 | Garnjost et al. | 92/168 |
| 4,664,362 | 5/1987 | Hennells | 92/168 |

FOREIGN PATENT DOCUMENTS

| | | | |
|---|---|---|---|
| 688232 | 6/1964 | Canada | 92/168 |
| 2158720 | 5/1973 | Fed. Rep. of Germany | 92/166 |
| 3100627 | 7/1982 | Fed. Rep. of Germany | 92/168 |
| 264218 | 1/1927 | United Kingdom | 92/165 R |
| 1423778 | 2/1976 | United Kingdom | 92/168 |

OTHER PUBLICATIONS

Lincoln Material Dispensing Systems Brochure (1988).

Primary Examiner—Edward K. Look
Assistant Examiner—Thomas Denion
Attorney, Agent, or Firm—Senniger, Powers, Leavitt & Roedel

[57] ABSTRACT

A reciprocating pump comprising a cylinder and a plunger reciprocable in the cylinder, a member at one end of the cylinder having an axial passage in which the plunger is axially slidable, and a seal between the member and the plunger. The pump is characterized in having a sleeve for protecting the seal from the effects of relatively high pressure and pressure fluctuations of fluid in the cylinder. The sleeve surrounds the plunger and is fixed in position inwardly of the member and has an axial bore in line with the axial passage in the member. The sleeve blocks communication from within the cylinder to the axial passage in the member except for such communication as there may be through the bore in the sleeve to the axial passage in the member. The plunger is axially slidable in the bore. The sleeve has internal grooving establishing a pressure reducing path for fluid from the inner to the outer end of the sleeve for reducing the pressure and fluctuations in pressure of fluid from the cylinder on the seal.

12 Claims, 2 Drawing Sheets 4,976,192

RECIPROCATING PUMP

BACKGROUND OF THE INVENTION

This invention relates to reciprocating pumps, and more particularly to a pump of the type comprising a cylinder having a plunger reciprocal therein and an elastomeric seal for the plunger where it extends out of one end of the cylinder for preventing leakage of the material being pumped.

Generally, these seals have been a point of weakness in prior pumps of the type to which this invention appertains, on account of being prone to being damaged particularly in relatively high pressure pumping operations by high pressure of the material in the cylinder and by large pressure fluctuations which result from the reciprocating action of the plunger. Further, build-up and drying out on the plunger of material being pumped may cause the seal to wear out rapidly, particularly when pumping industrial materials such as sealants, adhesives and inks.

SUMMARY OF THE INVENTION

Among the several objects of the invention may be noted the provision in a reciprocating plunger pump having an elastomeric seal for the plunger of means for reducing the internal pressure acting on the seal and to reduce the fluctuation in pressure on the seal, and the additional provision of means for avoiding build-up of material on the plunger, thereby to protect the seal and prolong its life.

In general, the invention involves a reciprocating pump comprising a cylinder and a plunger reciprocal in the cylinder. The pump has a member at one end of the cylinder having an axial passage in which the plunger is axially slidable and a seal between said member and the plunger, and is characterized by having means for protecting the seal from the effects of relatively high pressure and pressure fluctuations of fluid in the cylinder. This means comprises a sleeve surrounding the plunger fixed in position inwardly of said member having an axial bore in line with said axial passage in said member blocking communication from within the cylinder to said passage in said member except for such communication as there may be through said bore in the sleeve to said axial passage in said member, the sleeve having internal grooving creating a pressure reducing path for the pumped material from the inner to the outer end of said sleeve for reducing the pressure and fluctuations in pressure of said material on the seal.

Other objects and features will be in part apparent and in part pointed out hereinafter.

BRIEF DESCRIPTION OF THE DRAWINGS

FIG. 5 is a view in section of the scraper; and

FIG. 6 is a view of the scraper on line 6—6 of FIG. 5, showing the groove for a spring ring.

Corresponding reference characters indicate corresponding parts throughout the several views of the drawings.

DETAILED DESCRIPTION OF THE PREFERRED EMBODIMENT

Figure 1:
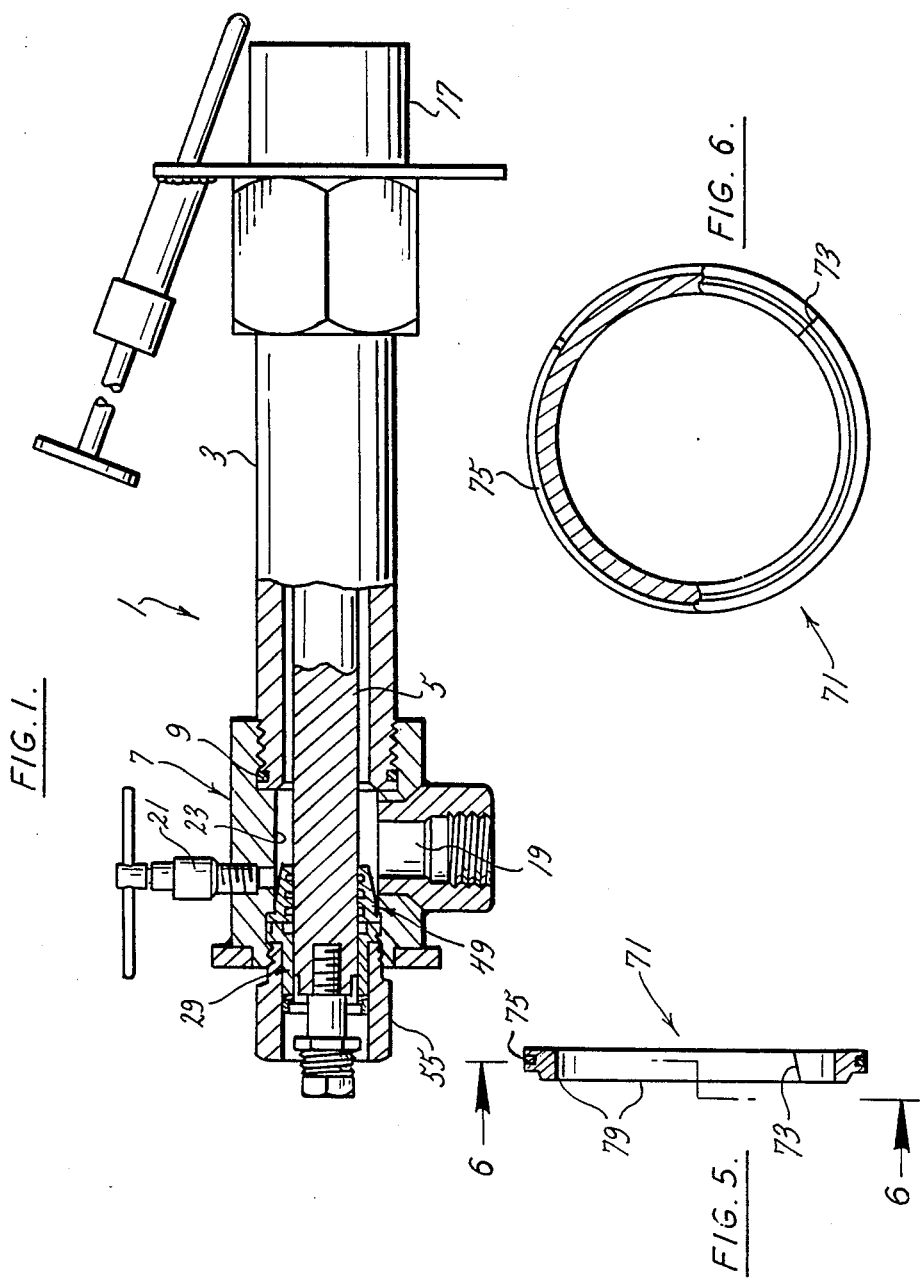
FIG. 1 is a side elevation view of a reciprocating pump of this invention with parts broken away to reveal details.
Figure 2:
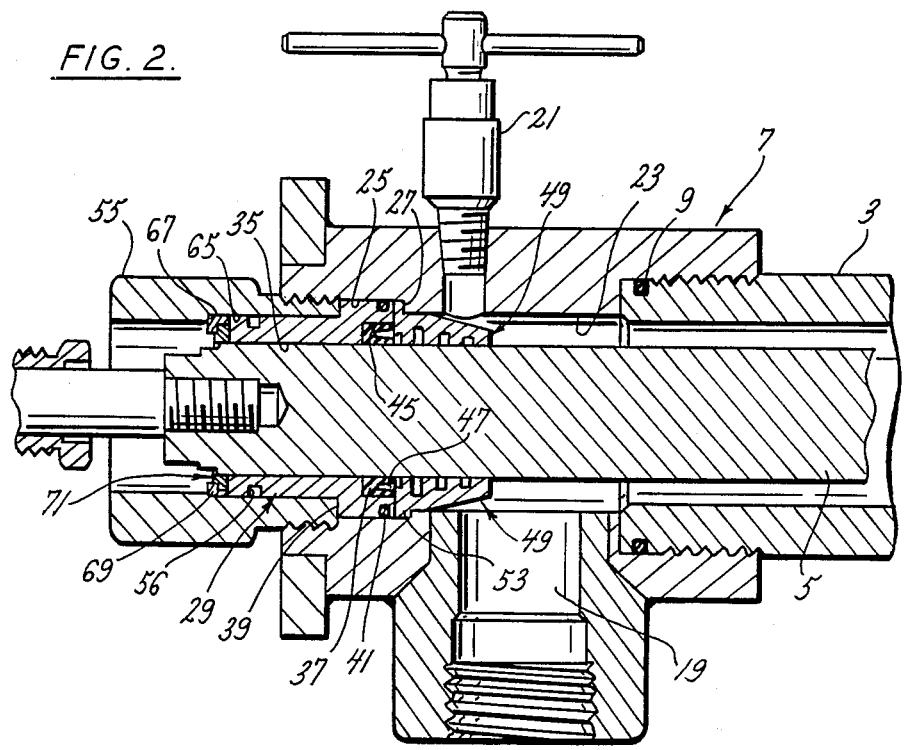
FIG. 2 is an enlarged fragment of FIG. 1.
Figure 3:
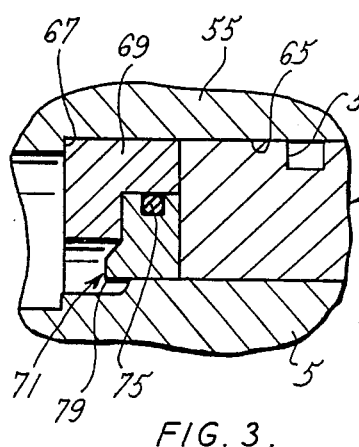
FIG. 3 is an enlarged fragment of FIG. 2 showing a scraper.
Figure 4:
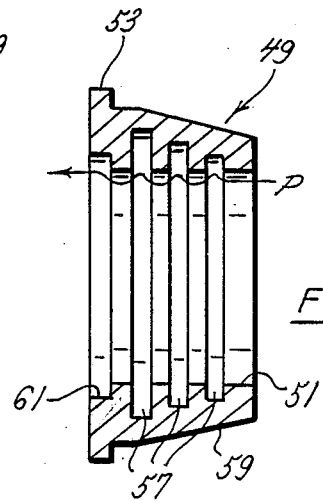
FIG. 4 is a vertical section of the sleeve.

Referring to the drawings, there is generally indicated at 1 a pump (e.g. a double acting pump) comprising a cylinder indicated in its entirety at 3, a plunger 5 reciprocal in the cylinder and a head, indicated generally at 7, threaded on one end, namely the outlet end, of the cylinder. The joint of the cylinder and the head is sealed by an O-ring 9 located in an annular groove in the end of the cylinder. A head 17 is threaded on the inlet end of the cylinder opposite the head 7. The head 7 has an outlet 19 through which material being displaced by the pump 1 is discharged, and a pressure relief valve 21 for relieving pressure in the pump 1 before disassembling the pump 1 for maintenance or repairs. There is a bore 23 through the head 7 which is generally in line with the cylinder 3 and a counterbore 25 at the axially outer end of the head providing an outwardly facing annular shoulder 27 at the axially inner end of the counterbore. The pump is of the same general type as that shown in U.S. Pat. No. 3,312,178, acting on an outward stroke of the plunger, i.e. a stroke toward the left as viewed in FIGS. 1 and 2, to pump fluid material in the left end of the cylinder out through the outlet 19 and draw material into the right end of the cylinder via a check valve in the head 17, and on an inward stroke of the plunger to pump fluid material from the right end of the cylinder to the left end via a valve associated with the plunger and thence out through the outlet 19, the check valve in head 17 closing on said inward stroke.

The pump 1 includes a tubular member or bushing, generally indicated at 29, having an axial passage 35 in which the plunger 5 is axially slidable, and an annular elastomeric seal 37 disposed around and sealingly engaging the plunger at the inner end of the bushing. The bushing 29 has a radially outwardly extending annular flange 39. An O-ring 41 fits in an annular peripheral groove in the flange for sealing between the bushing 29 and the head 7. A counterbore 45 at the axially inner end of the bushing 29 provides an annular recess in which the elastomeric seal 37 is received. The seal 37 has a groove 47 in its inner end forming lips which expand when the seal 37 is subjected to pressure to enhance the sealing engagement with the bushing and the plunger. A sleeve, indicated generally at 49, surrounds the plunger 5 and is fixed in position axially inwardly from the bushing 29. The sleeve 49 has an axial bore 51 in line with the axial passage 35 in the bushing 29, the plunger 5 being axially slidable in this bore. A peripheral flange 53 extends radially outwardly from the outer end of the sleeve 49 and engages the annular shoulder 27 in the head 7. A gland 55 is threaded in the counterbore 25 in the head, this gland fitting around the bushing 29 and has groove 56 for disassembly of the bushing 29 by prying bushing from counterbore 25. The inner end of the gland 55 engages the flange 39 on the bushing, which acts as a follower. The inner end of the bushing 29 holds the flange 53 on the sleeve 49 in sealing engagement with the annular shoulder 27 and compresses and holds the seal 37 against the outer end of the sleeve. The sleeve 49 blocks communication from within the cylinder 3 to the axial passage 35 in the pushing 29, except for such communication as there may be through the bore 51 in the sleeve.

The sleeve 49 is formed to act as means for protecting the elastomeric seal 37 from the effects of relatively high pressure and pressure fluctuations of material in the cylinder 3, having a series of annular internal grooves 57 spaced axially thereof providing a labyrinthine or tortuous path P for pumped material from the inner to the outer end thereof, also the sleeve 49 is tapered, diminishing in outside diameter toward its inner end, its tapered surface 59 providing a lesser obstruction to the flow of material to the outlet 19 to avoid reduction of the efficiency of the pump. The depth of an individual groove 57 into the wall created by the bore 51 in the sleeve 49 corresponds to the radial dimension of the tapered sleeve at the axial position of the groove, the depth of the grooves increases from the small of the large end of the sleeve. The sleeve also has a counterbore 61 at its axially outer end adjacent the seal 37 creating a cavity at the seal to optimize the effectiveness of the seal 37.

The gland 55 has a counterbore 65 toward its axially inner end forming an inwardly facing shoulder 67. An annular spacer 69 of L-shaped cross section, is held between the shoulder 67 of the gland 55 and the outer end of the bushing 29. At 71 is indicated scraping means comprising a discontinuous ring through which the plunger 5 is axially slidable. The discontinuity is a split 73 at which the free ends of the ring are contiguous. The split ring 71 is located in the annular recess formed by the spacer 69 and the outer end of the bushing 29 and is held against the outer end of the bushing 29 by the pressure of the inner end of the gland against the spacer. The split ring 71 has an annular peripherial groove receiving a spring 75 biasing the free ends of the split ring 71 toward a closed position. The split ring has a sharp edge 79 at the axially outer end of its radially inner surface abutting the plunger 5 for scraping off any build-up on the plunger of the material being displaced by the pump 1.

Tests have shown that the seal 37 in a pump having a internally grooved sleeve 49 lasts three to five times longer than the same seal in a pump having no such sleeve. In operation, the plunger 5, beginning as shown in outward passing through the bore 51 in the sleeve 49, the axial passage 35 in the bushing 29 and the scraping means 71. During the outward stroke, fluid material in the sleeve is drawn into the cylinder 3 through a check valve (not shown) in the head 17, while fluid material in the left end of the cylinder and in the head 7 is discharged through the outlet 19. Pressure, which develops in the head 7 to as much as 6500 psi, tends to be communicated to the seal 37 through the sleeve between the bore 51 and the plunger. It is believed that the narrow clearance between the bore 51 and the plunger slows the rate of pressure communication through the sleeve. It is also believed that when the pressure change reaches the first groove 57, and the two adjacent to it, there is a small compression of the fluid material present in the groove resulting in a further slowing of the rate of transmission of the pressure through the sleeve while pressure equalizes in the groove. Although pressure does increase at the seal, the sleeve slows the rate sufficiently to block communication of the pressure in the head to the seal long enough that the stroke of the pump changes over, thereby relieving the pressure in the head.

It is believed that the presence of the sleeve likewise reduces the rate at which the pressure adjacent the seal 37 can be relieved through the sleeve 49 to the head 7, when pressure in the head drops below that at the seal. The reduction in the rate of change in pressure at the seal 37, especially at the changeover from the inward to the outward stroke of the plunger, improves the ability of the seal 37 to block leakage. In the normal operation of a reciprocal pump without an internally grooved sleeve 49, the rate of change in pressure at the seal 37 can exceed the ability of the elastomeric material, out of which the seal 37 is made, to respond. Therefore, the lips of the seal 37 would not tightly engage the plunger 5 until after a high pressure had already developed at the seal 37 which would increase the likelihood of leakage at the seal during the changeover. The overall moderation in pressure fluctuation at the seal 37 also increases the life of the seal 37 with respect to fatigue.

In the absence of any means for removing the build-up of dried on material on the plunger, said material will come into contact with the seal 37, causing wear as it is passed through the seal on the plunger. A build-up of material typically occurs when the pump does not operate for a period of time, allowing the material on the plunger to dry and become affixed to the plunger. However, the reciprocating pump of this invention includes the split ring 71 having a sharp edge 79, which constitutes scraping means in this embodiment. On the inward stroke of the pump, material adhering to the plunger 5 impinges the sharp edge 79 of the split ring 71 and is scraped off of the plunger. By maintaining a plunger relatively free of material build-up, the life of the seal 37 is further increased.

In view of the above, it well be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A reciprocating pump comprising a cylinder and a plunger reciprocal therein, a member at one end of the cylinder having an axial passage in which the plunger is axially slidable and a seal between said member and the plunger, and characterized in having means for protecting the seal from the effects of relatively high pressure and pressure fluctuations of fluid in the cylinder comprising a sleeve surrounding the plunger, said sleeve being separate from said member and disposed in its entirety inwardly of said member and the seal, said sleeve having an axial bore in line with said axial passage in said member and blocking communication from within the cylinder to said axial passage in said member and the seal except for such communication as there may be through said bore in said sleeve to said axial passage in said member, said plunger being axially slidable in said bore, said sleeve having a series of annular internal grooves therein spaced axially thereof establishing a pressure-reducing path from the inner to the outer end of said sleeve for reducing the pressure and fluctuations in pressure of material from the cylinder on the seal.

2. A reciprocating pump as set forth in claim 1 having means at the outer end of said member for scraping the plunger.

3. A reciprocating pump as set forth in claim 1 wherein the sleeve has means at its outer end in sealing engagement with respect to the cylinder for blocking communication from within the cylinder to said axial passage in said member except for such communication as there may be through said bore in the sleeve to said axial passage in said member.

4. A reciprocating pump as set forth in claim 3 wherein the seal is at the inner end of said member and said member holds the seal compressed against the outer end of the sleeve and holds the sleeve in place.

5. A reciprocating pump as set forth in claim 4 wherein the grooving in the sleeve comprises a series of annular internal grooves in the sleeve spaced axially of the sleeve.

6. A reciprocating pump comprising a cylinder and a plunger reciprocal therein, a member at one end of the cylinder having an axial passage in which the plunger is axially slidable and a seal between said member and the plunger, and characterized in having means for protecting the seal from the effects of relatively high pressure and pressure fluctuations of fluid in the cylinder comprising a sleeve surrounding the plunger fixed in position inwardly of said member having an axial bore in line with said axial passage in said member and blocking commumication from within the cylinder to said axial passage in said member except for such communication as there may be through said bore in the sleeve to said axial passage in said member, said plunger being axially slidable in said bore, said sleeve having internal grooving establishing a pressure-reducing path from the inner to the outer end of said sleeve for reducing the pressure and fluctuations in pressure of material from the cylinder on the seal, and wherein said reciprocating pump further comprises a head at said one end of the cylinder, said head having a bore in line with the cylinder and a counterbore at the outer end thereof providing an outwardly facing annular shoulder at the inner end of the counterbore, said sleeve having an outwardly extending peripheral flange at its outer end engaging said shoulder, said member comprising a bushing having an outwardly extending annular flange and an annular recess at its inner end, the seal being an annular seal received in the recess, a gland threaded in the counterbore with the inner end of the gland engaging the flange on the bushing and with the inner end of the bushing holding the flange on said sleeve in sealing engagement with said annular shoulder and holding the seal compressed against the outer end of said sleeve.

7. A reciprocating pump as set forth in claim 6 having a seal between the bushing and the head.

8. A reciprocating pump as set forth in claim 6 having means for scraping the plunger held against the outer end of the bushing by the gland.

9. A reciprocating pump as set forth in claim 8 wherein the scraping means comprises a split ring surrounding the plunger at the outer end of the bushing and a spring ring around said split ring for contracting the split ring for scraping engagement with the plunger.

10. A reciprocating pump as set forth in claim 9 wherein the gland has a counterbore at the inner end thereof providing an inwardly facing annular shoulder at the outer end of the gland counterbore, and wherein the reciprocating pump further comprises an annular spacer engaging said inwardly facing gland shoulder and the outwardly facing end of the bushing, said scraping means being held between the spacer and said outwardly facing end of the bushing.

11. A reciprocating pump as set forth in claim 6 wherein the grooving in the sleeve comprises a series of annular internal grooves in the sleeve spaced axially of the sleeve.

12. A reciprocating pump as set forth in claim 11 wherein the sleeve is tapered, diminishing in outside diameter toward its inner end, and the grooves are of diminishing outer diameter from the outermost to the innermost groove.

* * * * *